United States Patent [19]
Dupuy et al.

[11] Patent Number: 5,982,829
[45] Date of Patent: Nov. 9, 1999

[54] TRANSMITTER, RECEIVER AND FRAME SUPPORTING VARIOUS DATA SIGNALING RATES

[75] Inventors: Pierre Dupuy, Paris; Laurent Cruchant, Rueil Malmaison, both of France

[73] Assignee: Alcatel Mobile Communication France, Paris, France

[21] Appl. No.: 08/301,585

[22] Filed: Sep. 7, 1994

[30] Foreign Application Priority Data

Sep. 8, 1993 [FR] France ................................. 93 10680

[51] Int. Cl.$^6$ ................................................. H04L 07/06
[52] U.S. Cl. ........................ 375/364; 375/365; 370/503
[58] Field of Search ................................. 375/365, 368, 375/364, 358; 370/110.1, 111, 82, 83, 100.1, 106, 105.4, 509, 503

[56] References Cited

U.S. PATENT DOCUMENTS 5,199,031  3/1993  Dahlin .................................. 370/110.1
5,299,235  3/1994  Larsson et al. ......................... 375/365
5,327,429  7/1994  Dartois et al. ........................... 370/82
5,461,618  10/1995  Chen et al. ............................ 370/470

FOREIGN PATENT DOCUMENTS

0527340A1  2/1993  European Pat. Off. .
0534612A2  3/1993  European Pat. Off. .

OTHER PUBLICATIONS

JP 1077333 dated Mar. 23, 1989, *Patent Abstracts of Japan*, vol. 13, No. 298 (E–784) Jul. 10, 1989.
French Search Report FR 9310680.

*Primary Examiner*—Chi H. Pham
*Assistant Examiner*—Bryan Webster
*Attorney, Agent, or Firm*—Sughrue, Mion, Zinn Macpeak & Seas, PLLC

[57] ABSTRACT

A transmission frame comprises a synchronization flag and data bits. It is formed of at least a first subframe in which occur the synchronization flag and an identification field which specifies the number of subframes. Each of the other subframes comprises blocking bits disposed so that the synchronization flag cannot occur in the subframes unless in conjunction with the first subframe.

9 Claims, 4 Drawing Sheets

FIG.1

| 0 | 0 | 0 | 0 | 0 | 0 | 0 | 0 |
|---|---|---|---|---|---|---|---|
| 1 | I | B1 | B2 | B3 | B4 | B5 | B6 |
| 1 | B7 | B8 | B19 | B10 | B11 | B12 | B13 |
| 1 | B14 | B15 | B16 | B17 | B18 | B19 | B20 |
| 1 | B21 | B22 | B23 | B24 | B25 | B26 | B27 |
| 1 | B28 | B29 | B30 | B31 | B32 | B33 | B34 |
| 1 | B35 | B36 | B37 | B38 | B39 | B40 | B41 |
| 1 | B42 | B43 | B44 | B45 | B46 | B47 | B48 |
| 1 | B49 | B50 | B51 | B52 | B53 | B54 | B55 |
| 1 | B56 | B57 | B58 | B59 | B60 | B61 | B62 |

FIG.2

| 1 | B63 | B64 | B65 | B66 | B67 | B68 | B69 |
|---|---|---|---|---|---|---|---|
| 1 | B70 | B71 | B72 | B73 | B74 | B75 | B76 |
| 1 | B77 | B78 | B79 | B80 | B81 | B82 | B83 |
| 1 | B84 | B85 | B86 | B87 | B88 | B89 | B90 |
| 1 | B91 | B92 | B93 | B94 | B95 | B96 | B97 |
| 1 | B98 | B99 | B100 | B101 | B102 | B103 | B104 |
| 1 | B105 | B106 | B107 | B108 | B109 | B110 | B111 |
| 1 | B112 | B113 | B114 | B115 | B116 | B117 | B118 |
| 1 | B119 | B120 | B121 | B122 | B123 | B124 | B125 |
| 1 | B126 | B127 | B128 | B129 | B130 | B131 | B132 |

TRANSMITTER, RECEIVER AND FRAME SUPPORTING VARIOUS DATA SIGNALING RATES

BACKGROUND OF THE INVENTION

Description of the Prior Art

In a system of synchronous communication between data processing equipments one of the most widely used methods for sending messages consists in defining a frame structure characterized by:

a synchronization flag, special coding of the data to be transmitted so that the synchronization flag cannot be recognized in the middle of the data stream transmitted.

One of the best known ways to implement this method is to choose a flag which is a constant stream of P binary zeros followed by a binary 1. The data is then coded simply by inserting a binary 1 each time that a series of (P−1) binary 0 has been transmitted. For example, if the flag is '00001', the message '0010 0000 10' is transmitted in the form: '00001 0010 00100 10'. The six underlined digits represent the synchronization flag and the inserted binary 1 (the spaces are included only to facilitate reading).

This method has a drawback: the time to transmit a message depends on its contents, which is a serious problem if a fixed routing time is required.

The known solution to this problem is to insert a binary 1 every (P−1) data bits transmitted: it is then certain that P consecutive binary zeros will never be encountered and the transmission time is always the same, regardless of the data transmitted. A well-known example of this method is the use of V.110 frames as defined by the CCITT (Comité Consultatif International du Téléphone et du Télégraphe). These frames comprise a flag made up of eight binary zeros followed by a binary 1, a binary 1 being then inserted every seven bits to form a frame of 80 bits, 17 bits used for synchronization and 63 bits for the data.

A frame can be represented by a table with P columns and L rows. The first row, known as the locking row, includes P binary zeros and subsequent rows, known as data rows, each comprise a synchronization bit at binary 1 followed by (P−1) data bits.

When data is transmitted by means of such frames the transmission channel often has a data signaling rate which is greater than that required to convey the frames produced by an equipment.

To economize on transmission channels it is natural to use multiplexing whereby the channels are divided into subchannels so that the data signaling rate of one subchannel conveys the data from one equipment.

For example, a full-rate channel comprises two half-rate subchannels, the bits of the channel being bits from each of the two subchannels alternately. Thus the odd-numbered bits of the channel are from a first subchannel and the even-numbered bits of the channel are from a second subchannel.

This use of a channel to convey two subchannels is feasible but it rules out the interchangeable use of two half-rate subchannels or one full-rate channel because the simultaneous reception of two subchannels can be interpreted as the reception of a single full-rate channel.

If a full-rate frame of P columns and L rows and a half-rate frame of P' columns and L' rows are chosen, with an even value for P an advantageous solution is to take P'=P/2 and L'=L.

The full-rate frame can be divided into first and second subframes respectively comprising the odd-numbered bits and the even-numbered bits of the full-rate frame. The first subframe is identical to the half-rate frame and the second subframe begins with a locking row of P' consecutive binary 0 followed by P'·(L−1) data bits.

Given that the first subframe is identical to the half-rate frame and that the locking row of P' consecutive binary 0 can appear in the second subframe or in the half-rate frame, some means of discrimination is required.

One simple means of discrimination is to provide an identification field which is substituted for data bits and indicates either a subframe or a half-rate frame. For example, a header bit can be replaced with a binary 0 in the subframe so that the receiver detects a synchronization error in the full-rate frame. The receiver must always receive a binary 1 at the start of a data row. However, if the header bit is forced to binary 0, binary 1 bits must be inserted on either side of this binary 0 bit to prevent the occurrence of P' consecutive binary 0.

A synchronization pattern is then defined as the combination of the synchronization flag and the identification field.

The synchronization pattern can occur in a half-rate frame or in the second subframe of a full-rate frame, since the latter includes a sequence of P'·(L−1) indeterminate bits.

It is assumed that the first and second subframes of a half-rate frame are conveyed by respective first and second subchannels.

It is clear that it is not possible to tell whether the subchannel is conveying a half-rate frame or the second subframe of a full-rate frame by analyzing the subchannel only. The data specifying the nature of the second subchannel is available only in the first subchannel. It is therefore necessary to wait for the processing to identify the first subchannel:

if a first subchannel is identified the second subchannel corresponds to a second subframe, if a half-rate frame is identified, recognition of the synchronization pattern in the second subchannel implies the presence of a half-rate frame.

Thus if the second subchannel conveys a half-rate frame, processing of this frame is deferred until the end of the identification processing. This introduces an undesirable time-delay into the transmission system.

Although the processing of the first subchannel is independent, the processing of the second subchannel is conditioned by the processing of the first subchannel. It follows that the modules processing each subchannel must communicate with each other, which complicates the implementation of the receiver.

An object of the present invention is therefore a frame structure defining a full-rate frame and a halfrate frame and a transmitter and a receiver between which such frames are exchanged and which can process a halfrate frame without any time-delay.

SUMMARY OF THE INVENTION

In a first aspect, the present invention consists in a transmission frame comprising a synchronization flag and data bits, formed by a first subframe at least in which said synchronization flag appears and an identification field which specifies the number of subframes, each of the other subframes comprising blocking bits disposed so that said synchronization flag can appear in said subframes only in conjunction with said first subframe.

Said blocking bits can additionally be disposed so that the synchronization flag cannot occur in any subframe other than the first subframe.

In a second aspect, the present invention consists in a transmission frame comprising a synchronization flag and data bits, formed of a first subframe at least in which said synchronization flag appears, each of the other subframes comprising blocking bits disposed so that said synchronization flag can appear in said subframes only in conjunction with said first subframe, all subframes each comprising an identification field which specifies if the latter is the last subframe of said frame.

The blocking bits can additionally be disposed so that the synchronization flag cannot occur in any subframe other than the first subframe.

A transmitter using the invention in its first aspect produces such frames and comprises means for indicating a frame comprising a plurality of subframes in the identification field.

If it produces frames comprising only a first subframe, it comprises means for indicating a frame comprising a single subframe in the identification field.

A transmitter using the invention in its second aspect produces such frames and comprises means for indicating in the identification field of the first subframe that it is a last subframe and for indicating in the identification field of the other subframes that they are not the last subframe.

If it produces frames comprising only a first subframe, it comprises means for indicating a last subframe in the identification field.

A receiver using the invention in its first aspect receiving subframes via subchannels comprises, for each subchannel, synchronization means for producing a validation signal associated with occurrence of said synchronization flag for each secondary subchannel different from said first subchannel, identification means for establishing in response to the validation signal associated with said secondary subchannel that the latter conveys a complete frame if the validation signal associated with said first subchannel is absent and, for said first subchannel, discriminator means which in response to the validation signal associated with said first subchannel look in said identification field for the subframe number forming the frame comprising the subframe conveyed by said first subchannel.

Identification means are additionally provided to establish in response to the validation signal associated with the secondary subchannel that the latter conveys a complete frame even if the validation signal associated with the first subchannel is present.

A receiver using the invention in its second aspect receiving subframes via subchannels comprises, for each subchannel, synchronization means to produce a validation signal associated with the occurrence of said synchronization flag, for each secondary subchannel different from the first subchannel, identification means for establishing in response to the validation signal associated with said secondary subchannel that the latter conveys a complete frame, and, for said first subchannel, discriminator means which in response to the validation signal associated with said first subchannel look in said identification field for the subframe number forming the frame comprising the subframe conveyed by said first subchannel.

The invention will emerge in more detail from the following description of embodiments of the invention given with reference to the accompanying drawings.

BRIEF DESCRIPTION OF THE DRAWINGS

FIG. 1 shows a first subframe.

FIG. 2 shows a second subframe.

DETAILED DESCRIPTION OF THE PREFERRED EMBODIMENT

Referring to FIG. 1, a half-rate frame or first subframe comprises:

a locking row formed of eight binary 0, a first data row comprising a header bit at binary 1, an identification bit I at binary 0, for example, and six data bits B1 through B6, a second data row comprising a header bit at binary 1 and the next seven data bits B7 through B13, a third data row comprising a header bit at binary 1 and the next seven data bits B14 through B20, and so on up to:

a ninth data row comprising a header bit at binary 1 and the last seven data bits B56 through B62.

The full-rate frame comprises a first subframe and a second subframe.

The first subframe is identical to the half-rate frame except that the identification bit assumes a different value, binary 1 in this example.

Referring to FIG. 2, the second subframe comprises ten data rows each formed of a blocking bit at binary 1 followed by seven data bits. Accordingly, the first data row comprises data bits B63 through B69, the second comprises data bits B70 through B76, and so on up to the last which comprises data bits B126 through B132.

It is clear that the synchronization flag of the first subframe formed by the locking row and the subsequent header bit cannot occur in the second subframe.

The invention therefore concerns a transmitter which produces half-rate frames with the format of the first subframe described above by setting the identification bit I to binary 0. The means required to achieve this will not be described as they form part of the prior art.

The invention also concerns a transmitter which produces full-rate frames by means of a first subframe in which it sets the identification bit to binary 1 and a second subframe. Here again the means needed to achieve this are part of the prior art and will not be described.

Of course, a transmitter can be designed to transmit both half-rate frames and full-rate frames.

Assumed that the transmission channel used comprises two subchannels. If the transmitter produces a full-rate frame it places the first subframe on the first subchannel whereas if it produces a half-rate frame, this is placed on one of the two subchannels.

The invention also concerns a receiver which receives the frames produced in this way.

Figure 3:
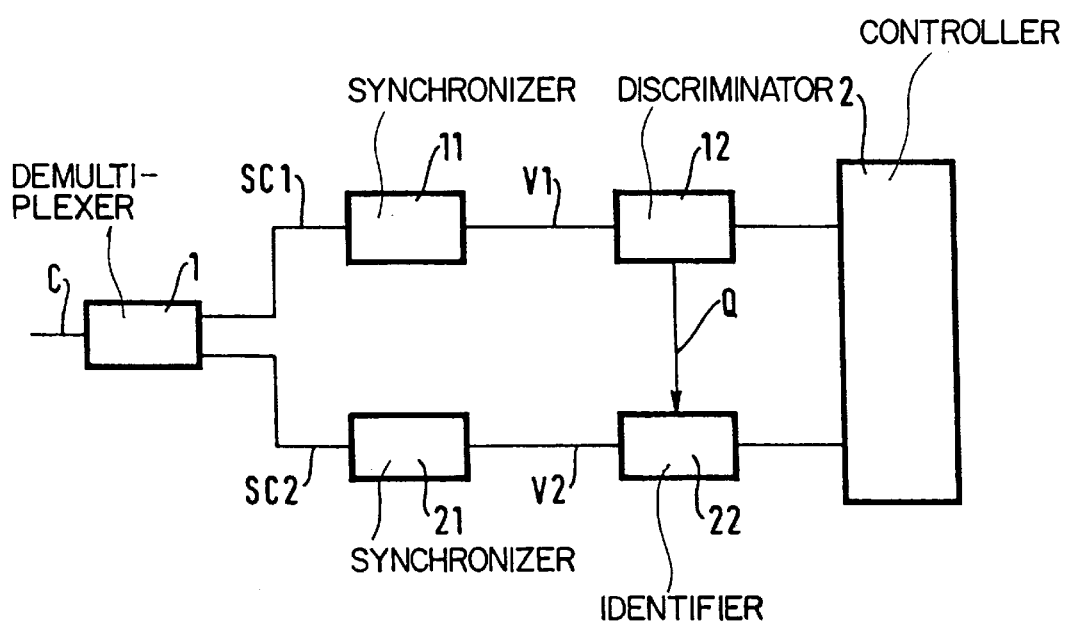
FIG. 3 shows a receiver block diagram.

Referring to FIG. 3, the receiver is therefore connected to the transmission channel C. It comprises a demultiplexer 1 to recover the first and second subchannels SC1 and SC2.

It comprises first synchronization means 11 which receive the first subchannel SC1 to look for synchronization on the synchronization flag and produce a first validation signal V1 if successful.

It further comprises discriminator means 12 which, in response to the first validation signal V1, identify the nature of the frame received by means of the identification bit I. It sends this data to a control circuit 2 responsible for transmission channel processing. This circuit is conventional in the prior art and will not be explained further.

The receiver also comprises second synchronization means 21 which receive the second subchannel SC2 to look for synchronization on the synchronization flag and to produce a second validation signal V2 if successful.

It further comprises identification means 22 which receive the second validation signal V2. In response to this signal they advise the control circuit that the second subchannel conveys a half-rate frame.

It is therefore clear that the receiver can process a half-rate frame received on the second subchannel SC2 as soon as the second validation signal V2 is received, independently of any data from the first subchannel SC1.

Note also that it is not indispensable for the first bit of the second subframe to be a blocking bit. If the first row of this subframe comprises only binary 0 bits, the second validation signal V2 will be produced in conjunction with the first validation signal V1 because the two subframes of a full-rate frame are transmitted in synchronism.

Thus in one variant of the receiver the discriminator means 12 produce a qualification signal Q which is at binary 0 if they have recognized a subframe originating from a full-rate frame or at binary 1 if they have recognized a half-rate frame.

The identification means 22 which receive this qualification signal identify the subframe they are analyzing as a half-rate frame or as the second subframe of a full-rate frame according to whether this signal is at binary 1 or binary 0, respectively.

Note that, in this variant, a communication link is required between the discriminator means 12 and the identifier means 22 to convey the qualification signal Q. On the other hand, one blocking bit is saved in the second subframe.

It goes without saying that the blocking bits can be anywhere in the second subframe provided that they prevent reproduction of the synchronization flag. For this it is sufficient for two blocking bits to be separated by at most seven data bits if the locking row comprises eight binary 0 bits; in the general case of a locking row with P binary 0 bits, (P−1) data bits at most are required between two consecutive blocking bits.

An identification bit I is reserved to indicate the nature of the respective subframe. This is merely one example of how to achieve this, and any prior art technique can be used instead. Consider the general case of an identification field in the subframe assuming two different values according to whether it identifies a full-rate frame or a half-rate frame.

In the above example the transmission channel comprises only two subchannels, a frame including either two subframes for the full-rate channel or a single subframe for the half-rate channel.

The invention applies regardless of the number of subchannels, each subchannel conveying one subframe. This covers the situation in which a full-rate frame occupies all of the subchannels whereas a low-rate frame uses only one subchannel. Each subframe of the full-rate frame except for the first, already described, is like the second subframe, already described.

All that is needed in this case is to provide in the receiver additional synchronizing means and additional identification means for each of the additional subchannels.

The invention applies to the very general case in which it is necessary to process a frame comprising p subframes in a channel including q subchannels.

The frame will comprise a first subframe as already defined and the subsequent subframes will be like the second subframe described with reference to FIG. 2, except that there is additionally an identification bit I.

For example, in this case the identification bit I indicates whether the subframe in which it appears is the last subframe of the frame or not, rather than the number of subframes.

The means required to achieve this in the transmitter will not be described as they are part of the prior art. These means indicate in the identification bit of a subframe whether it is a last subframe or not.

Figure 4:
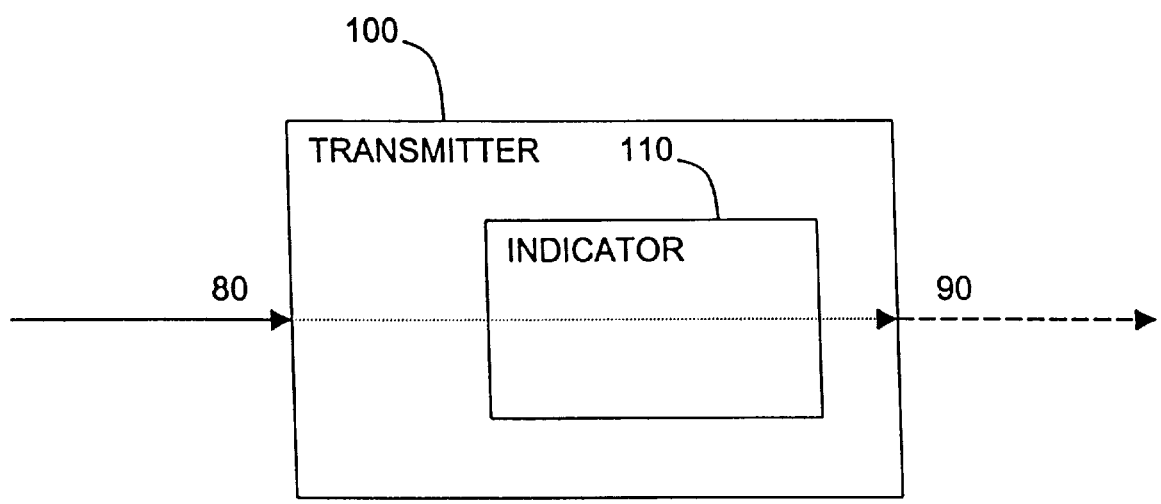
FIG. 4 shows a transmitter block diagram.

In FIG. 4 a transmitter is shown generally at 100. Data to be sent is shown at 80. When the data is formatted according to the above-identified invention, it is sent out as formatted data 90. Formatted data 90 includes the transmission frames produced by the transmitter. As one familiar with the technology will appreciate, reference numeral 110 shows a part of the transmitter that sets the value of the identification field.

The discriminator means and the identification means in the receiver as previously described are replaced with a definition unit for each subchannel.

In response to the validation signal associated with the same subchannel or in response to a control signal produced by the control circuit 2 the definition unit looks for the identification bit of the subframe in question to produce for the circuit 2 a status signal indicating whether this subframe is the last one in a frame or not.

The p subframes of the same frame appear in their order in the frame in p consecutive subchannels and in the same order.

Assuming that a frame of this kind is transmitted from the first subchannel, the control circuit will receive from the first definition unit a status signal indicating that the corresponding subframe is followed by further frames.

It will then produce a control signal sent to the definition unit of the second subchannel to acquire the nature of the subframe of the subchannel by means of the respective status signal. Assuming that the latter is present, it repeats this operation on the third subchannel, and so on up to the pth subchannel, where it detects the last subframe.

Detecting the identification bit in each subframe is no problem provided that its position in the subframe is known. The various subframes of a frame are transmitted in synchronism.

The control circuit then reconstitutes the complete frame from the p subframes.

The above reasoning naturally applies regardless of the subchannel on which the first subframe is transmitted.

Note that in this embodiment each frame received can be processed independently of the others because the synchronization flag appears only in the first subframe of a given frame.

Accordingly, as soon as synchronization has been achieved on a subchannel the associated validation signal is produced to indicate that this is the first subframe of a frame, whereupon processing of this frame can begin.

There is claimed:

1. A transmission frame comprising a synchronization flag and data bits, formed by N subframes, where N is an integer greater than or equal to one, each of said N subframes having an identical length, said N subframes including a first subframe containing said synchronization flag and also containing an identification field which specifies the number of subframes in said transmission frame, each subframe other then said first subframe comprising blocking bits disposed so that said synchronization flag can appear in said N subframes only in conjunction with said first subframe.

2. A transmission frame comprising a synchronization flag and data bits, formed of N subframes, where N is an integer greater than or equal to one, each of said N subframes having an identical length, said N subframes including a first subframe containing said synchronization flag, each subframe other than said first subframe comprising blocking bits disposed so that said synchronization flag can appear in said N subframes only in conjunction with said first subframe, each of said N subframes comprising an identification field which specifies if said each subframe is the last subframe of said frame.

3. A transmitter producing transmission frames, each of said transmission frames comprising a synchronization flag and data bits, formed by N subframes, where N is an integer greater than one, each of said N subframes having an identical length, said N subframes including a first subframe containing said synchronization flag and also containing an identification field which specifies the number of subframes in said transmission frame, each subframe other than said first subframe comprising blocking bits disposed so that said synchronization flag can appear in said N subframes only in conjunction with said first subframe, said transmitter comprising means for indicating, in said identification field, that said transmission frame comprises a plurality of said subframes.

4. A transmitter producing transmission frames, each of said transmission frames being formed by N subframes, where N is an integer greater than one, each of said N subframes having an identical length. and comprising only a first subframe containing a synchronization flag and data bits, and also containing an identification field, each subframe other than said first subframe comprising blocking bits disposed so that said synchronization flag cannot appear, said transmitter comprising means for specifying, in said identification field, that said transmission frame comprises a single subframe which contains said synchronization flag.

5. A transmitter producing transmission frames, each of said transmission frames comprising a synchronization flag and data bits, formed of N subframes, where N is an integer greater than one, each of said N subframes having an identical length. said N subframes including a first subframe containing said synchronization flag, each subframe other than said first subframe comprising blocking bits disposed so that said synchronization flag can appear in said N subframes only in conjunction with said first subframe, each of said N subframes comprising an identification field which specifies whether said each subframe is a last subframe of said transmission frame, said transmitter comprising means for specifying said identification field of each of said N subframes, including said last subframe.

6. A transmitter producing transmission frames, each of said transmission frames being formed of N subframes, where N is an integer greater than one, each of said N subframes having an identical length. said N subframes including a first subframe containing a synchronization flag, and data bits, each subframe other than said first subframe comprising blocking bits disposed so that said synchronization flag cannot appear, each of said N subframes comprising an identification field which specifies whether said each subframe is a last subframe of said transmission frame, said transmitter comprising means for specifying, in said identification field, whether each subframe of said transmission frame is a last subframe.

7. A receiver receiving transmission frames, each of said transmission frames comprising a synchronization flag and data bits, formed by N subframes, where N is an integer greater than one, said N subframes including a first subframe containing said synchronization flag and also containing an identification field which specifies the number of subframes in said each transmission frame, each subframe other than said first subframe comprising blocking bits disposed so that said synchronization flag can appear in said N subframes only in conjunction with said first subframe, said receiver receiving said subframes via subchannels, including a first subchannel and one or more secondary subchannels, said receiver comprising, for each of said subchannels, synchronization means for producing a validation signal associated with occurrence of said synchronization flag for each secondary subchannel, and a different validation signal associated with occurrence of said synchronization flag for said first subchannel, identification means for establishing, in response to said validation signal that said secondary subchannel conveys a complete frame if said different validation signal is absent and, for said first subchannel, discriminator means which, in response to said different validation signal, looks in said identification field for the subframe number forming the frame comprising the subframe conveyed by said first subchannel.

8. A receiver receiving transmission frames, each of said transmission frames comprising a synchronization flag and data bits, formed by N subframes, where N is an integer greater than one, said N subframes including a first subframe containing said synchronization flag and also containing an identification field which specifies the number of subframes in said each transmission frame, each subframe other than said first subframe comprising blocking bits disposed so that said synchronization flag can appear in said N subframes only in conjunction with said first subframe, wherein said blocking bits are so disposed that said synchronization flag cannot occur in any subframe other than said first subframe, said receiver receiving said subframes via subchannels, including a first subchannel and one or more secondary subchannels, said receiver comprising, for each of said subchannels, synchronization means to produce a validation signal associated with the occurrence of said synchronization flag for each secondary subchannel, and a different validation signal associated with occurrence of said synchronization flag for said first subchannel, identification means for establishing, in response to said validation signal that said secondary subchannel conveys a complete transmission frame, and, for said first subchannel, discriminator means which, in response to said different validation signal looks in said identification field for the subframe number forming the frame comprising the subframe conveyed by said first subchannel.

9. A receiver receiving transmission frames, each of said transmission frames comprising a synchronization flag and data bits, formed of N subframes, where N is an integer greater than one, said N subframes including a first subframe containing said synchronization flag, each subframe other than said first subframe comprising blocking bits disposed so that said synchronization flag appears in said N subframes only in conjunction with said first subframe, each of said N subframes comprising an identification field which specifies whether said each subframe is the last subframe of said transmission frame, wherein said blocking bits are disposed so that said synchronization flag cannot appear in any subframe other than said first subframe, said receiver receiving said subframes via subchannels, including a first subchannel and one or more secondary subchannels, said receiver comprising:

for each of said subchannels, synchronization means for producing a validation signal associated with the occurrence of said synchronization flag on one of said subchannels, a definition unit to produce a status signal indicating the nature of the corresponding subframe in response to the validation signal associated with said one of said subchannels or with a control signal, and a control circuit for producing said control signal addressed to said definition unit when said control circuit has received said status signal indicating that the subframe received on the subchannel preceding that associated with said definition unit is not the last subframe.

* * * * *